United States Patent
Bhorkar et al.

(10) Patent No.: US 10,477,416 B2
(45) Date of Patent: Nov. 12, 2019

(54) NETWORK TRAFFIC FORECASTING FOR NON-TICKETED EVENTS

(71) Applicant: AT&T Intellectual Property I, L.P., Atlanta, GA (US)

(72) Inventors: Abhijeet Bhorkar, Fremont, CA (US); Shraboni Jana, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

(21) Appl. No.: 15/783,789

(22) Filed: Oct. 13, 2017

(65) Prior Publication Data

US 2019/0116505 A1 Apr. 18, 2019

(51) Int. Cl.
| | | |
|---|---|---|
| *H04W 24/02* | (2009.01) | |
| *G06Q 50/00* | (2012.01) | |
| *G06N 3/02* | (2006.01) | |
| *H04W 84/04* | (2009.01) | |
| *H04W 24/08* | (2009.01) | |

(52) U.S. Cl.
CPC .............. *H04W 24/02* (2013.01); *G06N 3/02* (2013.01); *G06Q 50/01* (2013.01); *H04W 24/08* (2013.01); *H04W 84/042* (2013.01)

(58) Field of Classification Search
CPC .................................................... H04W 24/02
See application file for complete search history.

(56) References Cited

U.S. PATENT DOCUMENTS

| | | |
|---|---|---|
| 7,062,559 B2 | 6/2006 | Yoshimura et al. |
| 7,496,655 B2 | 2/2009 | Gopalan et al. |
| 7,725,342 B2 | 5/2010 | Keohane et al. |
| 8,005,073 B2 | 8/2011 | Kiss et al. |
| 8,260,921 B2 | 9/2012 | Uyama et al. |
| 8,914,041 B2 | 12/2014 | Bao et al. |
| 9,262,752 B2 | 2/2016 | Liu et al. |

(Continued)

FOREIGN PATENT DOCUMENTS

| | | |
|---|---|---|
| EP | 2375366 A1 | 10/2011 |
| WO | 2017142840 A1 | 8/2017 |

OTHER PUBLICATIONS

"TdF2014—Spectator Forecasting & Traffic Management", CIHT Breakfast Briefing, iht.org.uk, Jun. 11, 2014. 20 Pages. http://www.ciht.org.uk/download.cfm/docid/AD3087B2-84EE-4153-9365924AED42727F.

(Continued)

*Primary Examiner* — Jason E Mattis (57) ABSTRACT

An example method includes estimating a number of people expected to attend a non-ticketed event, based on electronic data including social media postings, estimating a per-person amount of network traffic expected to be generated on a communications network during the non-ticketed event, based at least in part on historical per-person network traffic statistics for a historical event of a similar type to the non-ticketed event, calculating an amount of total network traffic expected to be generated during the non-ticketed event, based at least on the number of people expected to attend the non-ticketed event and the per-person amount of network traffic, and implementing a modification to an infrastructure of the communications network in a geographic location of the non-ticketed event, based at least in part on the amount of total network traffic expected to be generated during the non-ticketed event.

20 Claims, 4 Drawing Sheets

(56) References Cited

U.S. PATENT DOCUMENTS

| | | | |
|---|---|---|---|
| 9,288,275 B2 | 3/2016 | Jain et al. | |
| 9,363,008 B2 | 6/2016 | Boss et al. | |
| 9,763,271 B1 | 9/2017 | Gabel | |
| 9,767,690 B2 | 9/2017 | Agrawal et al. | |
| 2005/0018611 A1 | 1/2005 | Chan et al. | |
| 2006/0092851 A1 | 5/2006 | Edlund et al. | |
| 2012/0157106 A1* | 6/2012 | Wang | H04W 16/04 455/446 |
| 2012/0209658 A1* | 8/2012 | Shibayama | G06Q 10/10 705/7.29 |
| 2015/0009857 A1* | 1/2015 | Rath | H04W 16/18 370/254 |
| 2015/0170045 A1 | 6/2015 | Kirkham et al. | |
| 2015/0227851 A1 | 8/2015 | Kaisser | |
| 2015/0294431 A1 | 10/2015 | Fiorucci et al. | |
| 2016/0132974 A1 | 5/2016 | Elias et al. | |
| 2017/0054641 A1* | 2/2017 | Anerousis | H04W 24/08 |
| 2017/0083872 A1 | 3/2017 | Blomberg et al. | |
| 2017/0132647 A1 | 5/2017 | Bostick et al. | |
| 2017/0156087 A1 | 6/2017 | Bostick et al. | |
| 2017/0230267 A1 | 8/2017 | Armolavicius et al. | |
| 2018/0013639 A1* | 1/2018 | Sanders | H04L 41/16 |
| 2018/0025373 A1* | 1/2018 | Perriman | G06Q 30/0205 |
| 2018/0063002 A1* | 3/2018 | Filley | G06Q 50/30 |

OTHER PUBLICATIONS

Dhiratara et al., "Social Media Data Analytics for Tourism—A Preliminary Study", KDWeb. 2016. 12 Pages http://ceur-ws.org/Vol-1748/paper-12.pdf.

"Capacity Planning: A Smarter Approach", Peak10 + Viawest, peak10.com, Jul. 14, 2014. 3 Pages http://www.peak10.com/capacity-planning-a-smarter-approach/.

Dong et al., "Inferring unusual crowd events from mobile phone call detail records", Joint European Conference on Machine Learning and Knowledge Discovery in Databases. Springer International Publishing, 2015. 18 Pages. https://arxiv.org/pdf/1504.03643.pdf.

Ni et al., "Using Social Media to Predict Traffic Flow under Special Event Conditions", TRB 93rd Annual Meeting, Paper No. 14-3315 (2014). pp. 1-23. https://www.acsu.buffalo.edu/~qinghe/papers/conference/2014%20Ni_socialmediatraffic.pdf.

Lang et al., "Predicting Network Response Times Using Social Information", 2011 International Conference on Advances in Social Networks Analysis and Mining (ASONAM) (2011). 5 Pages. http://cs.gmu.edu/~astavrou/research/Predicting_Network_ASONAM11.pdf.

* cited by examiner

NETWORK TRAFFIC FORECASTING FOR NON-TICKETED EVENTS

The present disclosure relates generally to the operation of communications networks, and relates more particularly to devices, non-transitory computer readable media, and methods for forecasting network traffic for events.

BACKGROUND

Events that draw a large number of attendees, such as sporting events, concerts, public demonstrations, parades, protests, and the like, may temporarily increase the traffic on a communications network in a localized area. For instance, participants in a public demonstration along several blocks of city streets may upload messages, photos, and/or videos to their social media accounts in real time during the demonstration. Thus, the amount of network traffic originating and terminating along those blocks during the demonstration may increase significantly over what is typical for the location (i.e., during times in which no events are occurring).

SUMMARY

An example method includes estimating a number of people expected to attend a non-ticketed event, based on electronic data including social media postings, estimating a per-person amount of network traffic expected to be generated on a communications network during the non-ticketed event, based at least in part on historical per-person network traffic statistics for a historical event of a similar type to the non-ticketed event, calculating an amount of total network traffic expected to be generated during the non-ticketed event, based at least on the number of people expected to attend the non-ticketed event and the per-person amount of network traffic, and implementing a modification to an infrastructure of the communications network in a geographic location of the non-ticketed event, based at least in part on the amount of total network traffic expected to be generated during the non-ticketed event.

An example system includes a processor and a computer readable medium storing instructions which, when executed by the processor, cause the processor to perform operations. The operations include estimating a number of people expected to attend a non-ticketed event, based on electronic data including social media postings, estimating a per-person amount of network traffic expected to be generated on a communications network during the non-ticketed event, based at least in part on historical per-person network traffic statistics for a historical event of a similar type to the non-ticketed event, calculating an amount of total network traffic expected to be generated during the non-ticketed event, based at least on the number of people expected to attend the non-ticketed event and the per-person amount of network traffic, and implementing a modification to an infrastructure of the communications network in a geographic location of the non-ticketed event, based at least in part on the amount of total network traffic expected to be generated during the non-ticketed event.

An example computer readable medium stores instructions which, when executed by the processor, cause the processor to perform operations. The operations include estimating a number of people expected to attend a non-ticketed event, based on electronic data including social media postings, estimating a per-person amount of network traffic expected to be generated on a communications network during the non-ticketed event, based at least in part on historical per-person network traffic statistics for a historical event of a similar type to the non-ticketed event, calculating an amount of total network traffic expected to be generated during the non-ticketed event, based at least on the number of people expected to attend the non-ticketed event and the per-person amount of network traffic, and implementing a modification to an infrastructure of the communications network in a geographic location of the non-ticketed event, based at least in part on the amount of total network traffic expected to be generated during the non-ticketed event.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and devices for forecasting network traffic for events. As discussed above, events that draw a large number of attendees, such as sporting events, concerts, public demonstrations, parades, protests, and the like, may temporarily increase the traffic on a communications network in a localized area. For instance, participants in a public demonstration along several blocks of city streets may upload messages, photos, and/or videos to their social media accounts in real time during the demonstration. Thus, the amount of network traffic originating and terminating along those blocks during the demonstration may increase significantly over what is typical for the location. If the local network infrastructure is not equipped to handle this increase in traffic, users of the communications network may experience a degradation in the network performance.

Although it may be possible to increase the capacity of the network if an increase in traffic is expected, it may be difficult to predict the amount by which the capacity needs to be increased, especially for events for which attendance is open-ended. For instance, events that are not ticketed could draw a theoretically limitless number of attendees, and this number could not be accurately ascertained in advance. Moreover, the number of attendees at such events may be subject to greater variation over time than ticketed events (e.g., attendees could arrive well after the start of the event, or leave well before the end). Similarly, in the case of a sudden event such as a natural disaster, large-scale accident, or attack, it is a challenge to determine how many people may be present at the scene of the event.

Examples of the present disclosure mine electronic data, including social media postings, to estimate the number of people expected to be in attendance at an event. The event may be a planned event (e.g., a planned public demonstration) or an unplanned event (e.g., a natural disaster or attack). In some examples, the event is a non-ticketed event. Based on historical information about similar events, the per-person (i.e., per-attendee) network traffic can be estimated to generate an estimate of the total traffic demand on the communications network in the area surrounding the event, during the event. A recommendation may be generated based on the estimate of the total traffic demand, where the recommendation includes making modifications to the network infrastructure at least in the area surrounding the event (e.g., temporarily deploying additional mobile evolved node B's (eNodeBs) or other hardware). The modifications may be designed to minimize the degradation in network performance that may be experienced by network users in the area surrounding the event, during the event.

Figure 1:
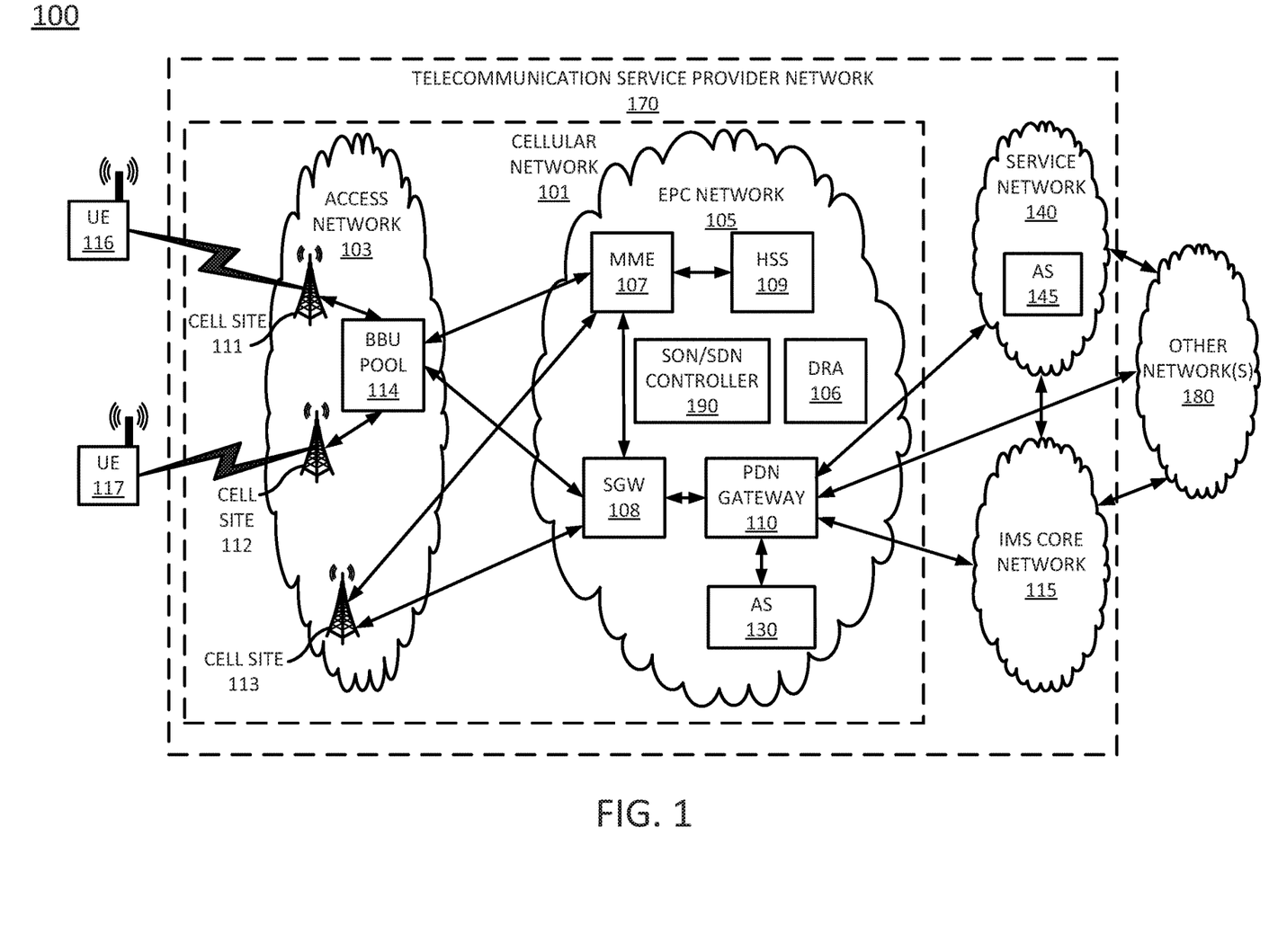
FIG. 1 illustrates an example network, or system in which examples of the present disclosure for forecasting network traffic may operate.

To better understand the present disclosure, FIG. 1 illustrates an example network, or system 100 in which examples of the present disclosure for forecasting network traffic may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 105. FIG. 1 also illustrates various mobile endpoint devices 116 and 117, e.g., user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "mobile endpoint devices").

In one example, the cellular network 101 may comprise an access network 103 and a core network, Evolved Packet Core (EPC) network 105. In one example, the access network 103 comprises a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may, in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, social media applications, and other services. As such, service network 140 may represent aspects of telecommunication service provider network 170 where infrastructure for supporting such services may be deployed. In one example, AS 145 may comprise all or a portion of a computing device or system, such as computing system 500, and/or processing system 502 as described in connection with FIG. 5 below, specifically configured to provide one or more service functions in accordance with the present disclosure. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively, and the allocation of baseband units in BBU pool 114. For instance, SON/SDN controller 190 (e.g., performing functions of a SON orchestrator) may activate an antenna of cell site 111 and assign a baseband unit in BBU pool 114 when a group of mobile endpoint devices is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure for activating antennas based upon a location and a movement of a group of mobile endpoint devices.

In one example, SON/SDN controller 190 may comprise all or a portion of a computing device or system, such as computing system 500, and/or processing system 502 as described in connection with FIG. 5 below, and may be configured to provide one or more functions to support examples of the present disclosure for forecasting network traffic for events, and for performing various other operations in accordance with the present disclosure. For example, SON/SDN controller 190 may work in conjunction with a cell site 111-113 and/or baseband unit of BBU pool 114 to track the signaling patterns of sample user endpoint devices 116 and/or 117, in connection with operations of the methods of FIGS. 2-4. For instance, SON/SDN controller 190 may store the observed signaling patterns of sample user endpoint devices during an event, and these signalizing patterns may be referred to when estimating the network traffic during future events of a similar type.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 500, and/or processing system 502 as described in connection with FIG. 5 below, and may be configured to perform various operations in connection with forecasting network traffic for events, and for performing various other operations in accordance with the present disclosure. For instance, AS 130 may host a web crawler or similar software application that mines the Internet, including social media applications, for data relating to future and/or in-progress events. In this regard, AS 130 may maintain communications with BBU pool 114, cell sites 111-113, and so forth, via PDN gateway 110 and SGW 108, for example. AS 130 may also have access to historical data regarding past events and associated network traffic, and may perform other operations based upon the historical data. For instance, AS 130 may generate an estimate of the network traffic that is expected to be generated in a geographic area during an event, and may further generate a recommendation for modifying the network infrastructure at least in the geographic area of the event to accommodate the expected network traffic.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additional be provided by AS 145.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for forecasting network traffic for events. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for forecasting network traffic for events in accordance with various examples of the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
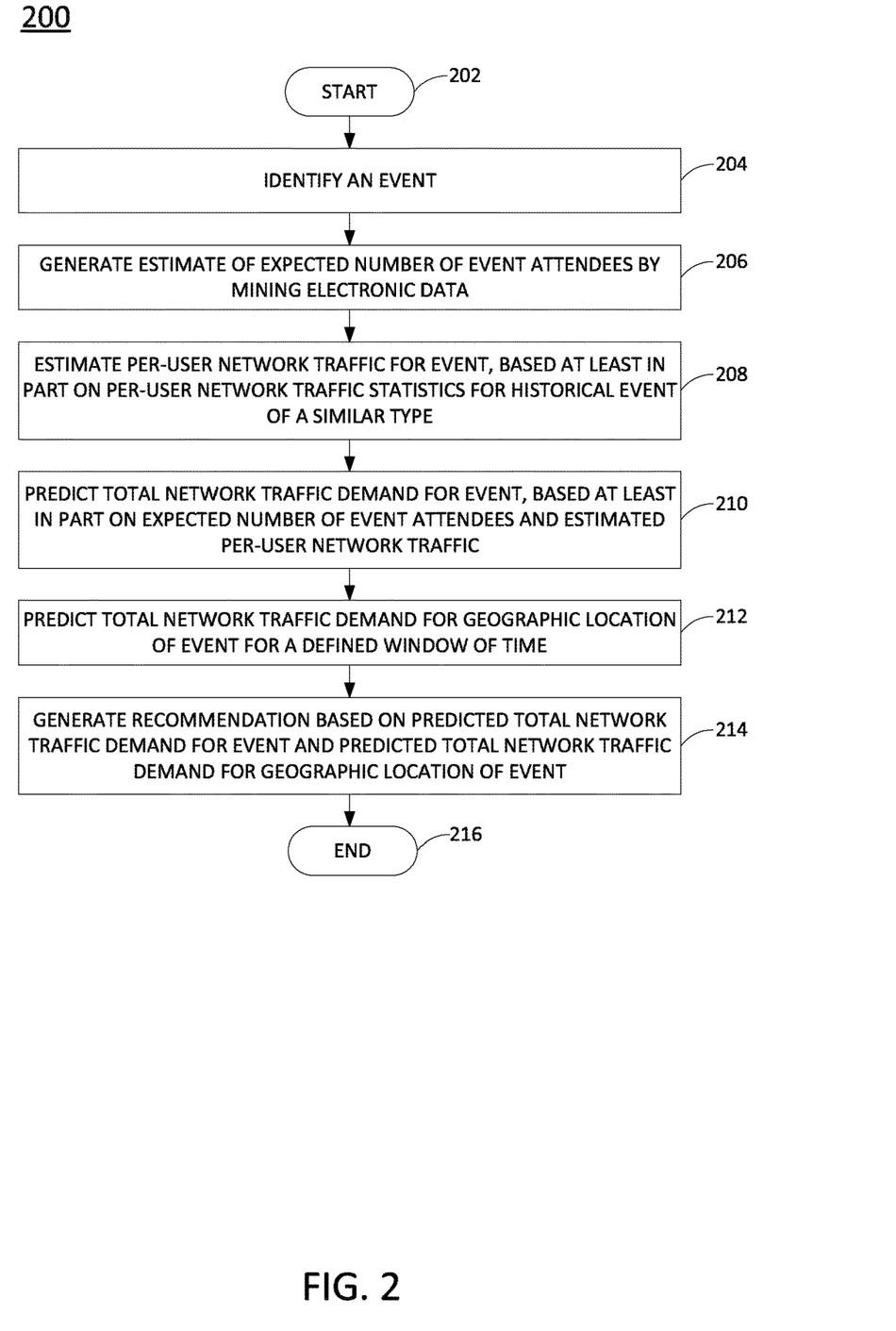
FIG. 2 illustrates a flowchart of an example method for forecasting network traffic for events, in accordance with the present disclosure.

FIG. 2 illustrates a flowchart of an example method 200 for forecasting network traffic for events, in accordance with the present disclosure. In one example, steps, functions and/or operations of the method 200 may be performed by a device as illustrated in FIG. 1, e.g., an application server, or any one or more components thereof. In one example, the steps, functions, or operations of the method 200 may be performed by a computing device or system 500, and/or a processing system 502 as described in connection with FIG. 5 below. For instance, the computing device 500 may represent at least a portion of an application server in accordance with the present disclosure. For illustrative purposes, the method 200 is described in greater detail below in connection with an example performed by an application server, such as 130 or 145 of FIG. 1.

The method 200 begins in step 202. In step 204, the application server identifies an event. In one example, identification of the event includes identifying the name, date, time, location/venue, and/or maximum capacity of the event. The event may be a planned event that is scheduled to take place at some time in the future (e.g., a planned public demonstration), a planned event that is currently ongoing, or an unplanned, suddenly occurring event (e.g., a natural disaster). In one example, the event is a non-ticketed event, i.e., tickets or other forms of passes are not issued to control or limit attendance numbers. In one example, the event is explicitly identified by a user. For instance, a user may identify a specific event as a means of initiating a forecast of the network traffic that the event is expected to generate. In another example, the event may be identified without user input, e.g., by mining news items, social media, venue web sites, event planning web sites (e.g., websites promoting various events), ticketing websites and other sources of electronic data using a web crawler or similar technology. In this case, natural language understanding techniques may be used to identify relevant information.

In step 206, the application server generates an estimate of the expected attendance at the event. For instance, the application server may estimate how many people are expected to attend the event. In one example, the application server generates this estimate by mining news items, social media, venue web sites, and other sources of data using a web crawler or similar technology. For instance, users of a social media application may post updates expressing their interest in the event (e.g., by expressing an explicit intent to attend the event or by bookmarking, re-posting, or "liking" postings related to the event). Each individual social media user who posts or bookmarks such an update may be considered as a potential attendee of the event. Information like this can be mined from various sources and analyzed (e.g., using natural language processing) to determine an approximate number of people who intend to attend the event. Such information may be valuable for large scale events, and particularly for events that do not require a ticket for attendance. In the case of ticketed events, the application server may also have access to information about the number of tickets offered for sale or that have been sold. For instance, information may be obtained from online portals through which tickets can be purchased, or from web sites related to event venues (which may provide information regarding seating capacity for various types of events). One example of a specific method for estimating the number of people expected to attend an event is described in greater detail in connection with FIG. 3.

In step 208, the application server estimates the per-user (or per-user endpoint device) network traffic for the event. In one example, the per-user network traffic is estimated based at least in part on the type or class of the event. For instance, a historical event of a similar type can be identified, and the per-user traffic for the historical event can be used to extrapolate the expected per-user traffic during the identified event. Available per-user traffic statistics for the historical event might include, for example, key performance indicators like average upload data rate, average download data rate, accessibility, retainability every x minutes, and other data that can be extracted from call trace records (e.g., using the historical event time and user locations to filter relevant traffic). Using the per-user traffic of the historical event, the per-user traffic for the event can be predicted in one example by performing a time series estimate. Since traffic demand tends to increase steadily with time, the time series may adjust the estimate to account for future increases in demand. One example of a specific method for estimating the per-user network traffic for the event is described in greater detail in connection with FIG. 4.

In step 210, the application server predicts the total network traffic demand for the event, based in part on the estimate of the expected attendance and on the estimated per-user traffic. In one example, the total traffic demand is predicted by multiplying the estimate of the expected attendance by the estimated per-user traffic.

In step 212, the application server predicts the total network traffic demand at a geographical location of the event for a defined window of time (e.g., x minutes). The geographical location of the event may include the event venue (e.g., a stadium), plus some defined radius of distance (e.g., x miles) around the event venue. Thus, the total traffic demand may include not just the estimated network traffic generated by attendees of the event, but also the estimated network traffic generated by others in the vicinity of the event, who may not be attending the event (e.g., workers in office buildings along a parade route, or tailgating by individuals in the parking lot of a large stadium for a sports event who do not have tickets to the sports event itself).

In step 214, the application server generates a recommendation, based at least in part on the predicted total traffic demand for the event (as predicted in step 210) and on the predicted total traffic demand for the geographic location of the event (as predicted in step 212). The recommendation may comprise a temporary modification to the network infrastructure at least in the geographic area of the event, to accommodate the expected network traffic. For instance, the recommendation may involve the deployment of one or more mobile eNodeBs in the geographic area of the event. In further examples, the recommendation may involve the strategic placement of additional antennas to form a distributed antenna system (DAS) that maximizes radio coverage in the geographic location of the event. In further examples still, the recommendation may involve the deployment of portable base stations, such as cells on wheels (COWs). COWs temporarily increase communication capacity and provide free WiFi/LTE-U (e.g., small cell access points for offloading Internet traffic from cellular to cellular base stations.

In a further embodiment still, as 5G networks are being deployed and traffic estimation is considered in view of network virtualization, virtualized network functions (VNFs) such as virtual mobility management entities (vMMEs), virtual evolved packet data gateways (vePDGs), virtual packet data network gateways (vPDGs), and virtual baseband units (vBBUs) can be recommended for dynamic instantiation to improve network capacity.

In any of these cases, generating a recommendation may further involve automatically and dynamically implementing any of the recommendations. In one example, implementing a recommendation may involve sending signals to mobile equipment (e.g., mobile eNodeB's, antennas of a DAS, COWs, etc.) that direct the equipment to particular locations and/or activate the equipment and its connections to the communications network. In another example, implementing a recommendation may involve automatic provisioning of appropriate VNFs by a SON/SDN controller and the like. The method 200 ends in step 216.

Figure 3:
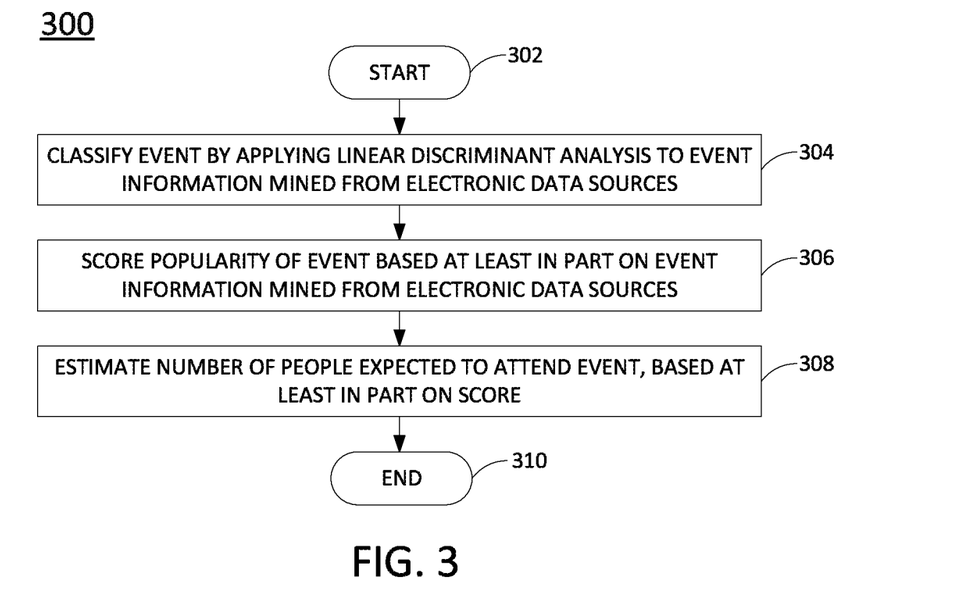
FIG. 3 illustrates a flowchart of an example method for estimating the number of people expected to attend an event, e.g., in accordance with the method illustrated in FIG. 2.

FIG. 3 illustrates a flowchart of an example method 300 for estimating the number of people expected to attend an event, e.g., in accordance with step 206 of the method 200 illustrated in FIG. 2. As such, in one example, steps, functions and/or operations of the method 300 may be performed by a device as illustrated in FIG. 1, e.g., an application server, or any one or more components thereof. In one example, the steps, functions, or operations of the method 300 may be performed by a computing device or system 500, and/or a processing system 502 as described in connection with FIG. 5 below. For instance, the computing device 500 may represent at least a portion of an application server in accordance with the present disclosure. For illustrative purposes, the method 300 is described in greater detail below in connection with an example performed by an application server, such as 130 or 145 of FIG. 1.

The method 300 begins in step 302. In step 304, the application server classifies the event by performing linear discriminant analysis (LDA) on information about the event that has been collected from electronic data sources such as social media (e.g., according to the method 200 as described above). As discussed above, the event classification may comprise a large-scale sporting event (e.g., a professional sports championship game), a small-scale sporting event (e.g., a college sports game), a large-scale concert (e.g., a music festival), a small-scale concert (e.g., a local music event), a family event (e.g., a parade or fair), a public demonstration (e.g., a march), a protest, a natural disaster (e.g., a flash flood or tornado), a large-scale accident (e.g., a water main break or train accident), an attack (e.g., a bombing or shooting), or the like. The event may be further classified as a planned or unplanned event.

In step 306, the application server scores the popularity of the event, again based at least in part on the information about the event that has been collected from electronic data sources, such as social media (e.g., according to the method 200 as described above). In one example, the application server performs sentiment analysis on the information collected from social media. This analysis may consider the type of the event (e.g., as determined in step 304), the performer(s) involved in the event (if any), historical attendance at events involving the performer(s), and the number of "likes" or similar endorsements received by the performer(s) by social media users.

In one particular example, the popularity of the event and the performer(s) involved are scored individually. For instance, the popularity $P_E$ of an event may be calculated as:

$$P_E = (C*\text{comments} + L*\text{likes})*100/\text{views} \quad \text{(EQN. 1)}$$

where C and L are constants, the term "comments" is the number of user comments posted on a social media page associated with the event, the term "likes" is the number of likes or similar user endorsements (i.e., excluding comments) posted on the social media page associated with the event, and the term "views" is the number of views (e.g., total views or views from individual users) accumulated by the social media page associated with the event.

Similarly, the score $P_P$ of a performer may be calculated as:

$$P_P = (C*\text{comments} + L*\text{likes})*100/\text{views} \quad \text{(EQN. 2).}$$

where C and L are constants, the term "comments" is the number of user comments posted on a social media page associated with the performer, the term "likes" is the number of likes or similar user endorsements (i.e., excluding comments) posted on the social media page associated with the performer, and the term "views" is the number of views (e.g., total views or views from individual users) accumulated by the social media page associated with the performer.

The popularity of the event may also be computed based on information that is not necessarily collected from a dedicated social media page for the event. For instance, the event may be mentioned in user feeds on a microblogging site. In this case, the popularity $P_E$ of the event may be calculated as:

$$P_E = \frac{\text{\# of mentions of event in last } x \text{ minutes}}{\text{\# of mentions of event originating at geographical location of event}} \quad \text{(EQN. 3)}$$

where the geographical location of the event may encompass a particular geographical radius (e.g., within y miles of event center) or a more specific location (e.g., a particular park or sports arena).

In another example, the popularity of the event may be approximated as the Klout Score for the performer(s) involved in the event, as obtained from Lithium Technologies' KLOUT social media data analytics application. In this example, the Klout Score of the performer(s) is computed from a plurality of major social networking sites, considering complex social interactions in social media. In one example, the Klout Score for the performer(s) is considered in relation to at least one other performer. In a further example, the Klout Score may be scaled up with respect to the highest scoring performer who previously performed at the venue or location at which the event is to take place.

In step 308, the application server estimates the number of people expected to attend the event. In one example, the number N of people expected to attend the event is estimated as:

$$N = \text{popularity score} * \text{maximum capacity of event} \quad \text{(EQN. 4)}$$

where the popularity score may be computed according to any of EQNs. 1-3 (or estimated according to the Klout Score) as a percentage. Thus, the number of people expected to attend the event is a fraction or percentage of the event's maximum capacity. In some examples, e.g., where the event is not ticketed or the event venue's capacity is open-ended, the maximum capacity of the event may be estimated. For instance, the maximum capacity may be estimated as the number of attendees of the most well-attended past event at the venue or as the number of attendees who attended a similar event at a different venue. In a further example, the estimated number of people expected to attend the event can be refined based on real-time estimates of the road or foot traffic in the vicinity of the event, during a window of time that encompasses the duration of the event. In this case, "real-time" indicates the data is delivered to the application server substantially immediately after it is logged, subject to any network delays. The "vicinity" of the event may be some defined geographic area that encompasses the event venue, plus a defined radius of distance (e.g., x miles) around the event venue. The estimates of the road and foot traffic may be obtained from road traffic sensors placed within this vicinity. In one example, estimates from these sensors may be used to estimate the number of people present at an unplanned event, such as a natural disaster or other sudden events. The method 300 ends in step 310.

Figure 4:
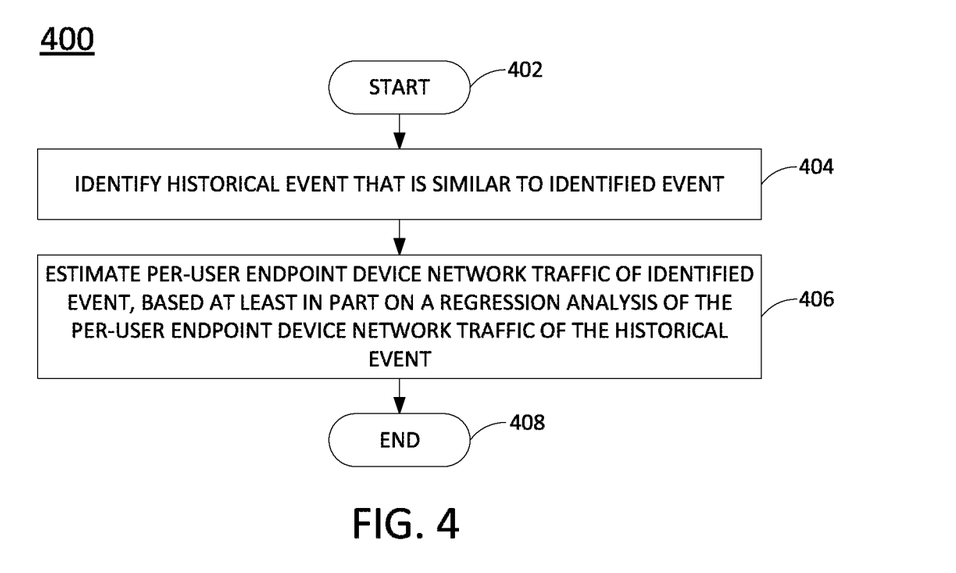
FIG. 4 illustrates a flowchart of an example method for estimating the average network traffic per user endpoint device an event, e.g., in accordance with the method illustrated in FIG. 2.

FIG. 4 illustrates a flowchart of an example method 400 for estimating the average network traffic per user endpoint device at an event, e.g., in accordance with step 208 of the method 200 illustrated in FIG. 2. As such, in one example, steps, functions and/or operations of the method 400 may be performed by a device as illustrated in FIG. 1, e.g., an application server, or any one or more components thereof. In one example, the steps, functions, or operations of the method 400 may be performed by a computing device or system 500, and/or a processing system 502 as described in connection with FIG. 5 below. For instance, the computing device 500 may represent at least a portion of an application server in accordance with the present disclosure. For illustrative purposes, the method 400 is described in greater detail below in connection with an example performed by an application server, such as AS 130 or 145 of FIG. 1.

The method 400 begins in step 402. In step 404, the application server identifies an historical event or events that are similar to the event. For instance, if the event is a professional sports championship game, similar historical events would include other professional sports championship games (possibly of the same league) rather than, for example, concerts that occurred at the same venue.

In step 406, the per-user endpoint device network traffic of the event is estimated based at least in part on the per-user endpoint device network traffic observed at the similar historical event(s). In one example, the per-user endpoint device network traffic of the event is estimated using a regression analysis of the similar historical event(s) as:

$$N(t) = (T(t) + S(t) + R(t)) \quad \text{(EQN. 5)}$$

where N(t) represents the network traffic value as a function of time, S(t) is a seasonality component (e.g., representing the day of the week), T(t) is a trend component as a function of time (e.g., to account for network traffic increases as demand for video and other media from the event increases), and R(t) is an irregular component representing a measure of error in the estimation.

In the case of EQN. 5, the trend component T(t) assumes that the growth in network traffic is exponential. In this regard, the trend component T(t) may be modeled as:

$$(T(t+1))=b0+b11+T(t) \tag{EQN. 6}$$

where b0 and b1 are constants. More specifically b0 is a constant representing a bias and may be calculated as an average network traffic load over a set of training examples. b1 is a constant representing a coefficient of T(t) which captures a dependency on a previous time. These constants are estimated based on prediction models and data at hand.

The seasonality component S(t) may be modeled to consider the traffic variation over weekdays. For instance, the traffic can be modeled as a cyclic component according to:

$$S(t+1)=a|\cos(wt+o)1+S(t) \tag{EQN. 7}$$

where a is a constant that represents a highest magnitude of change due to seasonality, w represents the frequency of the change due to seasonality, and o represents an offset at time t=0. As a whole, EQN. 7 models periodicity of the changes in network traffic over time.

In another example, rather than using a time series to estimate the per-user endpoint device network traffic, a deep recurrent neural network may be used. In this case, the neural network hidden layer may model the seasonality, burst, and trend components without explicit parameterization. However, more data will be needed to train the network. The method 400 ends in step 408.

In addition, although not specifically specified, one or more steps, functions or operations of the respective methods 200-400 may include a storing, displaying and/or outputting step as required for a particular application. In other words, any data, records, fields, and/or intermediate results discussed in the method can be stored, displayed and/or outputted either on the device executing the method or to another device, as required for a particular application. Furthermore, steps, blocks, functions or operations in any of FIGS. 2-4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

Figure 5:
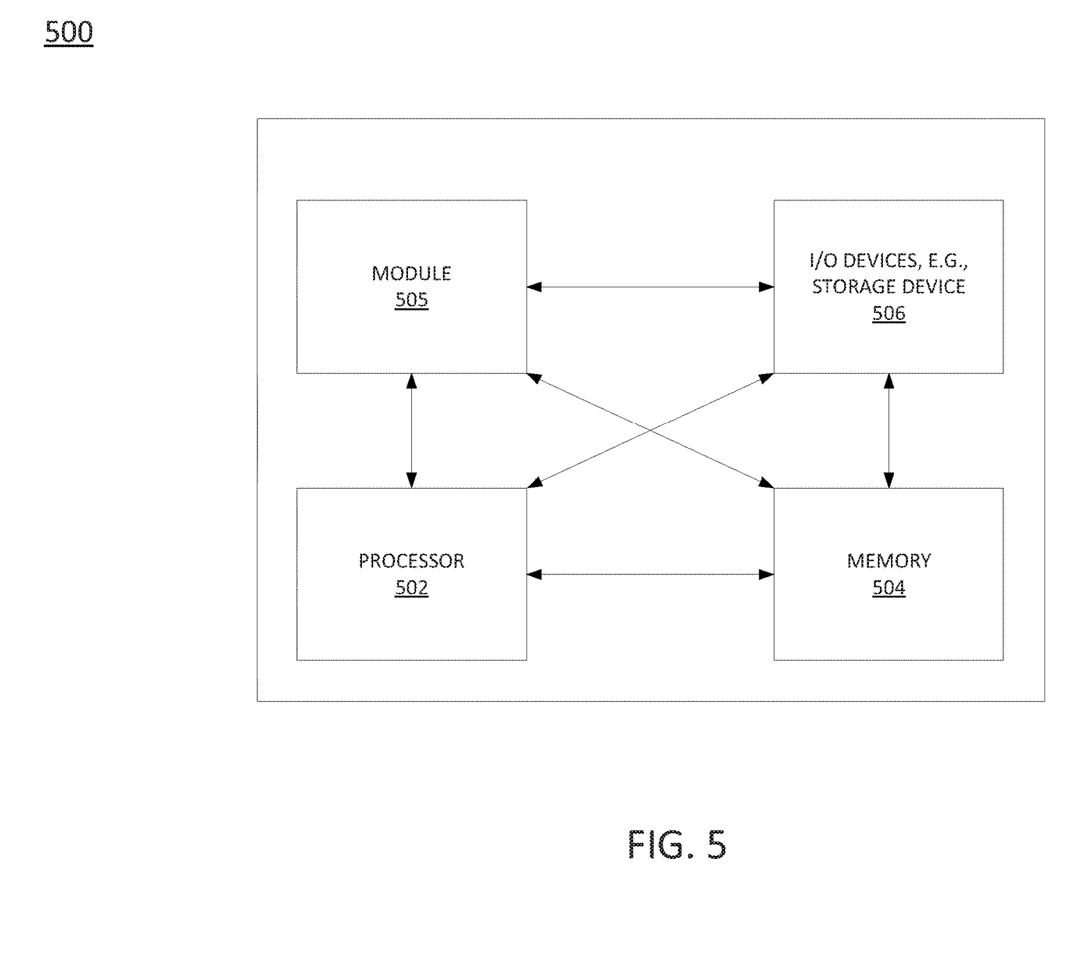
FIG. 5 illustrates an example of a computing device, or computing system, specifically programmed to perform the steps, functions, blocks, and/or operations described herein.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for forecasting network traffic for events, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if any one or more of the methods 200-400 as discussed above are implemented in a distributed or parallel manner for a particular illustrative example, i.e., the steps of the above methods 200-400, respectively, or each of the entire methods 200-400, respectively, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 200-400. In one example, instructions and data for the present module or process 505 for forecasting network traffic for events (e.g., a software program comprising computer-executable instructions) can be loaded into memory 504 and executed by hardware processor element 502 to implement the steps, functions or operations as discussed above in connection with the illustrative methods 200-400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for forecasting network traffic for events (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    estimating a number of people expected to attend a non-ticketed event, based on electronic data including social media postings, wherein the estimating the number of people expected to attend the non-ticketed event comprises:
        generating a popularity score for the non-ticketed event, based at least in part on the social media postings, wherein the popularity score is calculated as a number of mentions of the non-ticketed event in the social media postings within a defined window of time divided by a number of mentions of the non-ticketed event in the social media postings that originate at a geographic location of the non-ticketed event; and
        calculating the number of people expected to attend the non-ticketed event as the popularity score multiplied by a maximum capacity of the non-ticketed event;
    estimating a per-person amount of network traffic expected to be generated on a communications network during the non-ticketed event, based at least in part on historical per-person network traffic statistics for a historical event of a similar type to the non-ticketed event;
    calculating an amount of total network traffic expected to be generated during the non-ticketed event, based at least on the number of people expected to attend the non-ticketed event and the per-person amount of network traffic; and
    implementing a modification to an infrastructure of the communications network in the geographic location of the non-ticketed event, based at least in part on the amount of total network traffic expected to be generated during the non-ticketed event.

2. The method of claim 1, wherein the non-ticketed event is a planned event that is set to occur at a future time.

3. The method of claim 1, wherein the non-ticketed event is a planned event that is currently ongoing.

4. The method of claim 1, wherein the non-ticketed event is an unplanned event that is currently ongoing.

5. The method of claim 1, wherein the number of people expected to attend the non-ticketed event is updated based on real-time estimates of road traffic within a defined geographic area surrounding in a vicinity of the non-ticketed event.

6. The method of claim 1, wherein the estimating the per-person amount of network traffic comprises performing a time series estimate using the historical per-person network traffic statistics for the historical event.

7. The method of claim 1, wherein the per-person amount of network traffic is calculated as a function of time as $(T(t)+S(t)+R(t))$, where $S(t)$ is a seasonality component, $T(t)$ is a trend component as a function of time, and $R(t)$ represents a measure of error, wherein the trend component assumes an exponential growth in the per-person amount of network traffic, and wherein the seasonality component is modeled to consider traffic variation over weekdays.

8. The method of claim 1, wherein the estimating the per-person amount of network traffic comprises using a deep recurrent neural network to model seasonality, burst, and trend components of the historical per-person network traffic statistics for the historical event.

9. The method of claim 1, wherein the modification includes deploying temporary infrastructure and equipment to accommodate the amount of total network traffic expected to be generated during the non-ticketed event.

10. The method of claim 9, wherein the temporary infrastructure and equipment includes a mobile evolved nodeB.

11. The method of claim 9, wherein the temporary infrastructure and equipment includes a distributed antenna system.

12. The method of claim 9, wherein the temporary infrastructure and equipment includes a portable base station.

13. The method of claim 1, wherein the modification includes instantiating a virtual network function.

14. The method of claim 1, wherein the historical event is identified by performing a linear discriminant analysis on the electronic data in order to classify the non-ticketed event.

15. A system comprising:
    a processor; and
    a computer-readable medium storing instructions which, when executed by the processor, cause the processor to perform operations, the operations comprising:
        estimating a number of people expected to attend a non-ticketed event, based on electronic data including social media postings, wherein the estimating the number of people expected to attend the non-ticketed event comprises:
            generating a popularity score for the non-ticketed event, based at least in part on the social media postings, wherein the popularity score is calculated as a number of mentions of the non-ticketed event in the social, media postings within a defined window of time divided by a number of mentions of the non-ticketed event in the social media postings that originate at a geographic location of the non-ticketed event; and
            calculating the number of people expected to attend the non-ticketed event as the popularity score multiplied by a maximum capacity of the non-ticketed event;
        estimating a per-person amount of network traffic expected to be generated on a communications network during the non-ticketed event, based at least in part on historical per-person network traffic statistics for a historical event of a similar type to the non-ticketed event;
        calculating an amount of total network traffic expected to be generated during the non-ticketed event, based at least on the number of people expected to attend the non-ticketed event and the per-person amount of network traffic; and
        implementing a modification to an infrastructure of the communications network in the geographic location of the non-ticketed event, based at least in part on the amount of total network traffic expected to be generated during the non-ticketed event.

16. The system of claim 15, wherein the non-ticketed event is a planned event that is set to occur at a future time.

17. The system of claim 15, wherein the non-ticketed event is a planned event that is currently ongoing.

18. The system of claim 15, wherein the non-ticketed event is an unplanned event that is currently ongoing.

19. The system of claim 15, wherein the number of people expected to attend the non-ticketed event is updated based on real-time estimates of road traffic within a defined geographic area in a vicinity of the non-ticketed event.

20. A non-transitory computer-readable medium storing instructions which, when executed by a processor, cause the processor to perform operations, the operations comprising:

estimating a number of people expected to attend a non-ticketed event, based on electronic data including social media postings, wherein the estimating the number of people expected to attend the non-ticketed event comprises:

generating a popularity score for the non-ticketed event, based at least in part on the social media postings, wherein the popularity score is calculated as a number of mentions of the non-ticketed event in the social media postings within a defined window of time divided by a number of mentions of the non-ticketed event in the social media postings that originate at a geographic location of the non-ticketed event; and calculating the number of people expected to attend the non-ticketed event as the popularity score multiplied by a maximum capacity of the non-ticketed event;

estimating a per-person amount of network traffic expected to be generated on a communications network during the non-ticketed event, based at least in part on historical per-person network traffic statistics for a historical event of a similar type to the non-ticketed event;

calculating an amount of total network traffic expected to be generated during the non-ticketed event, based at least on the number of people expected to attend the non-ticketed event and the per-person amount of network traffic; and implementing a modification to an infrastructure of the communications network in the geographic location of the non-ticketed event, based at least in part on the amount of total network traffic expected to be generated during the non-ticketed event.

* * * * *